United States Patent [19]

McLean et al.

[11] 4,339,862

[45] Jul. 20, 1982

[54] METHOD OF MAKING RUBBER/VISCOUS TORSIONAL VIBRATION DAMPERS

[75] Inventors: Ronald L. McLean, Tonawanda; Gordon W. Kamman, Elma, both of N.Y.

[73] Assignee: Houdaille Industries, Inc., Fort Lauderdale, Fla.

[21] Appl. No.: 258,565

[22] Filed: Apr. 29, 1981

Related U.S. Application Data

[62] Division of Ser. No. 119,218, Feb. 7, 1980.

[51] Int. Cl.³ .......................... B23P 11/00; B23P 17/00
[52] U.S. Cl. ........................................... 29/424; 29/451
[58] Field of Search ................. 29/424, 450, 451, 458, 29/460, 522 R, 527.1, 527.3, 530; 74/574; 188/378, 379, 380

[56] References Cited

U.S. PATENT DOCUMENTS

| | | | |
|---|---|---|---|
| 1,892,505 | 12/1932 | Evans | 74/574 X |
| 1,939,855 | 12/1933 | Kreis | 74/574 |
| 3,603,172 | 9/1971 | Hall | 188/379 X |
| 4,046,230 | 9/1977 | Troyer | 74/574 X |
| 4,114,246 | 9/1978 | Kamman | 29/451 |
| 4,200,004 | 4/1980 | Bremer | 74/574 |
| 4,254,847 | 3/1981 | Kamman et al. | 188/379 |
| 4,262,553 | 4/1981 | Bremer | 74/574 |

FOREIGN PATENT DOCUMENTS 828266 2/1960 United Kingdom .................. 74/574

Primary Examiner—Ervin M. Combs
Attorney, Agent, or Firm—Hill, Van Santen, Steadman, Chiara & Simpson

[57] ABSTRACT

In tuned rubber/viscous torsional vibration damper assemblies of the kind having supporting rotor disk means mounting an inertia mass coupled to the disk means by viscous damping medium and elastic tuning spring, spacing and sealing rubber rings are produced by providing a low melting point metal barrier in the assembly between rubber ring accommodating grooves and the viscous damping medium working chamber defined within the inertia mass, the rubber rings molded and vulcanized in situ in said grooves and to the rotor disk and the inertia mass, whereafter the barrier is melted out and the damper completed. The dampers may be provided with rubber spacer and bumper fingers extending from the rubber rings into the working chamber of the damper. The rubber rings may also be keyed to the inertia mass by means of integral lugs extending into socket apertures in the inertia mass. The dampers may be coated with a rubber skin on outside areas, the skin being connected to exposed areas of the rubber rings.

17 Claims, 16 Drawing Figures

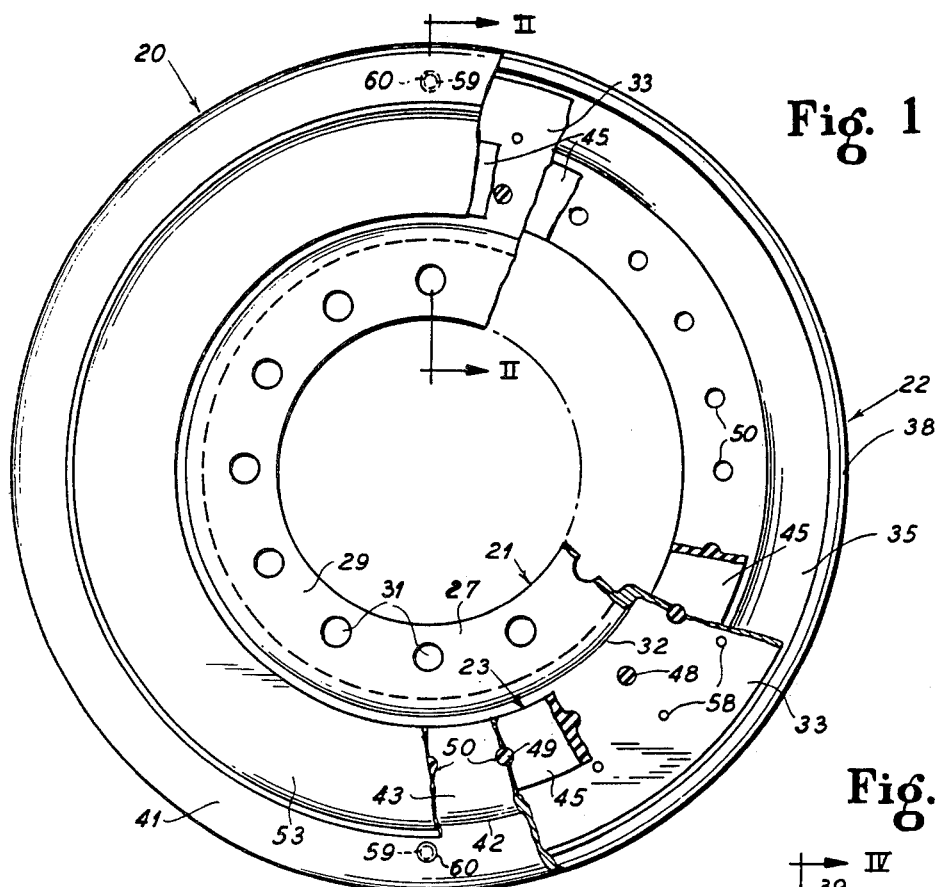

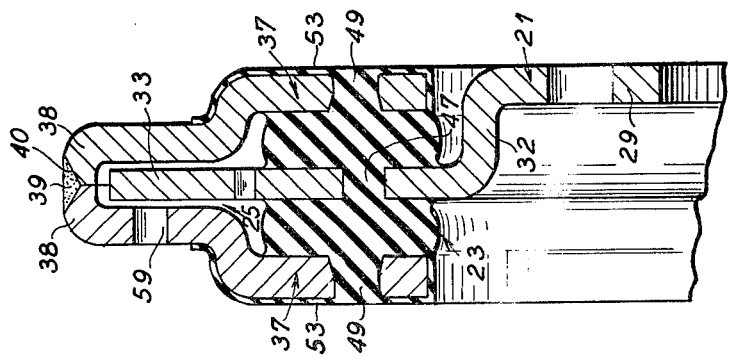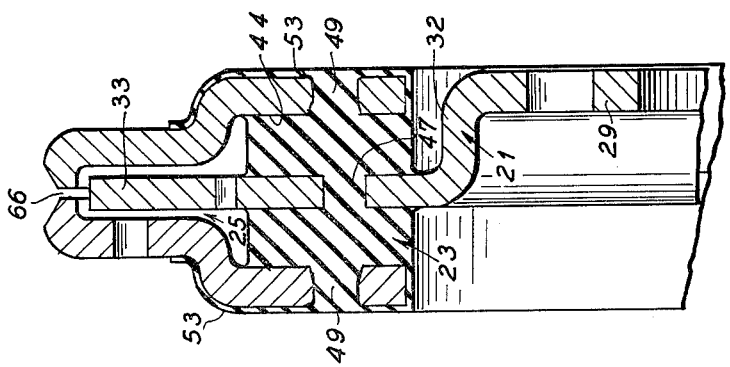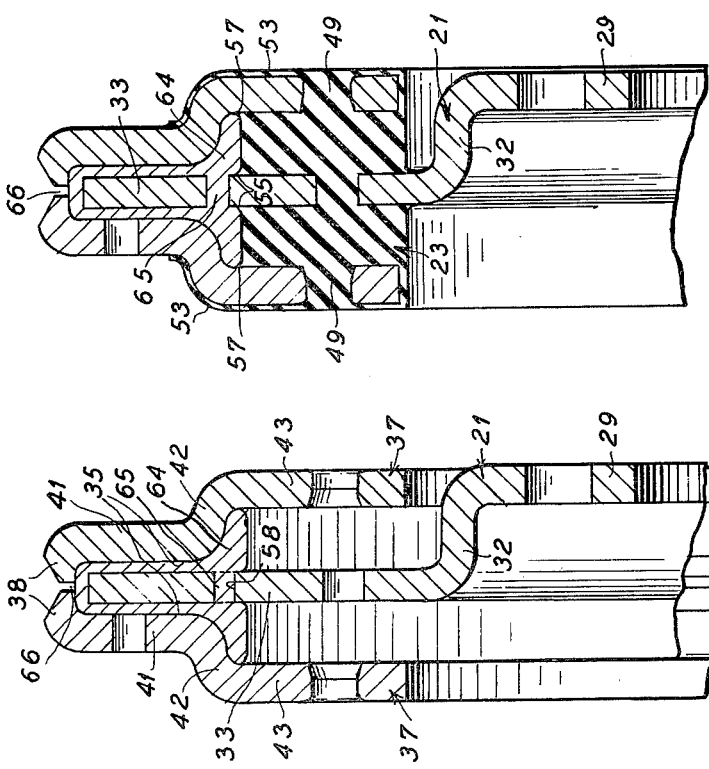

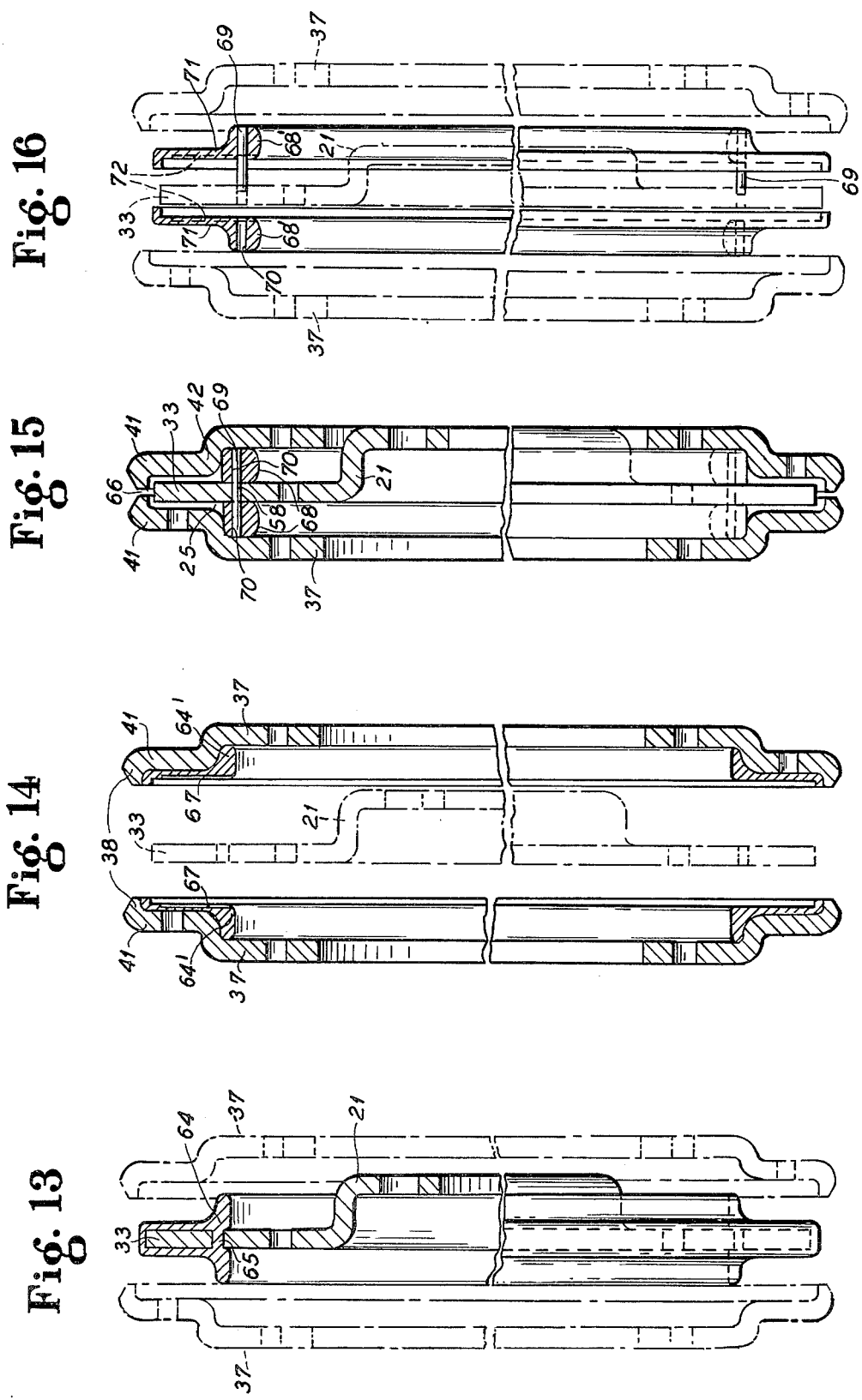

METHOD OF MAKING RUBBER/VISCOUS TORSIONAL VIBRATION DAMPERS

This is a division of application Ser. No. 119,218, filed Feb. 7, 1980.

This invention relates to rubber/viscous torsional vibration dampers and method of making the same, and is more particularly concerned with such dampers of the type embodying an annular inertia mass mounted on a rotor disk and coupled thereto for damping purposes by means of not only a viscous damping medium but also by means of combination damping, sealing, connecting and spacer elastic rubber rings. Dampers of this type are especially useful for damping torsional vibrations in crankshafts of internal combustion engines of automotive road vehicles such as automobiles and trucks.

Several problems are encountered in the manufacture of these dampers. For purposes of economy, the principal parts of the dampers should be fabricated at as low cost and as standardized as practicable. By way of example, reference is made to U.S. Pat. No. 4,114,246 in which the damper comprises a rotor disk which is adapted to be economically fabricated as a stamping of heavy gauge metal such as steel. A pair of complementary stamped heavy gauge sheet metal, such as steel, plate members are joined to provide the annular inertia mass. Inwardly opening grooves in the inertia mass members have elastic tuning spring, spacing and sealing rings coupling opposite surface areas of the inertia mass and the rotor disk. Radially outwardly relative to the elastic rings a working chamber is defined by and housed within the inertia mass, and a viscous damping medium in such chamber operates between shear film spaced cooperatively confronting working surfaces of the rotor disk and the inertia mass.

In this type of damper, maintaining concentricity of the inertia mass members and the elastic rings and the rotor disk during assembly has always presented a problem. Further, numerous handling steps in assembling the parts and joining the elastic rings in the assembly have added to manufacturing costs. Adhesive bonding of the rubber rings to the other damper parts has presented a problem due to the severe stresses which must be resisted in service of the dampers. In situ vulcanization of the rubber rings has been a problem, because according to prior practice, molding of the rings to one part of the assembly has still required adhesive bonding to the other part of the assembly.

Within the working chamber the shear film spacings must be maintained critically in order to attain proper functioning of the damper in service. Therefore, where the damper is provided with separately formed and assembled elastic rings, extreme care must be taken to have the rings of identical size and durometer in order to attain the necessary uniform spacing between working surfaces in the working chamber.

Insofar as we are aware, no practical method has heretofor been proposed for complete in situ vulcanizing of the rubber rings simultaneously to the inertia mass and the rotor disc, although that would obviously be the most economical way to produce the dampers.

An important object of the present invention is to provide a new and improved method of making rubber/viscous torsional vibration dampers of the rotor disk and annular inertia mass type by vulcanize bonding rubber tuning spring, spacing and sealing rings in coupling relation to both the inertia mass and the rotor disk.

Another object of the invention is to provide a new and improved method of making rubber/viscous torsional vibration dampers which will substantially simplify and reduce the cost of producing such dampers.

A further object of the invention is to provide a new and improved method of making rubber/viscous torsional vibration dampers embodying improved features having regard to function and durability of such dampers.

Still another object of the invention is to provide a new and improved rubber/viscous torsional vibration damper assembly having novel means for assuring freedom from contact between working surfaces under operating circumstances where axial forces may tend to displace the working parts relatively toward one another.

A yet further object of the invention is to provide a new and improved tuned rubber/viscous torsional vibration damper having a unique interlocking of elastic tuning spring, spacing and sealing rings with the associated parts of the damper.

It is also an object of the invention to provide a new and improved tuned rubber/viscous torsional vibration damper assembly of the character indicated provided with a novel protective covering.

The invention provides a method of making a rubber/viscous torsional vibration damper assembly of the type having supporting rotor disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides of and facing axially toward said body radially inwardly adjacent to the opening from said chamber, with elastic tuning spring, spacing and sealing rubber rings coupling surface areas on said inertia mass in said grooves with opposing surface areas on said body, comprising providing low melting point metal barrier means between said working chamber and said grooves, vulcanize bonding said rubber rings in said grooves and to said surface areas while relying on said barrier means against any detrimental intrusion of material of said rings into said working chamber, curing said rings, and melting and removing said barrier means and thereby freeing the volume within said inertia mass occupied by said barrier means for receiving a fill of said viscous damping medium.

The invention also provides a tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, said body dividing said working chamber into axially opposite sides, a viscous damping medium in each opposite side of said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling surface areas on said inertia mass in said grooves with opposing surface areas on said body, comprising one or more of the following improvements (a) a circumferentially spaced plurality of rubber fingers extending radially from said rings and secured fixedly to certain of said working surfaces in each axial side of said working chamber, said fingers being of a thickness less than the shear film space between said working surfaces in each side of said working chamber, and functioning as spacers or bumpers to prevent direct contact between said working surfaces in the event of axial load or displacement forces tending to move said rotor disk and said inertia mass axially relative to one another; (b) an annular series of spaced apertures through said surface areas of said inertia mass, and integral lugs on said rings and filling said apertures; (c) said rubber rings having portions thereof exposed at the outside of said inertia mass, and a rubber skin coating outside areas of said inertia mass and connected to said exposed areas of said rings.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a side face elevational view, partially broken away to reveal details of structure, of a rubber/viscous torsional vibration damper assembly embodying the invention;

FIG. 2 is an enlarged fragmentary sectional detail view taken substantially along the line II—II of FIG. 1;

FIG. 3 is a view similar to FIG. 2, but showing a modification;

FIG. 4 is a sectional elevational view taken substantially along line IV—IV of FIG. 3;

FIGS. 5 to 8 are views similar to FIG. 2, but showing successive steps in making the damper of FIGS. 1 and 2;

FIG. 13 is a schematic vertical sectional elevational view related to FIGS. 5 and 9 and showing low melting point barrier means mounted on the rotor disk;

FIG. 14 is a schematic vertical sectional view showing low melting point barrier means molded onto the inertia mass plate members;

FIG. 15 shows another embodiment of the low melting point barrier means; and

FIG. 16 shows another embodiment of the low melting point barrier means.

Figure 9:
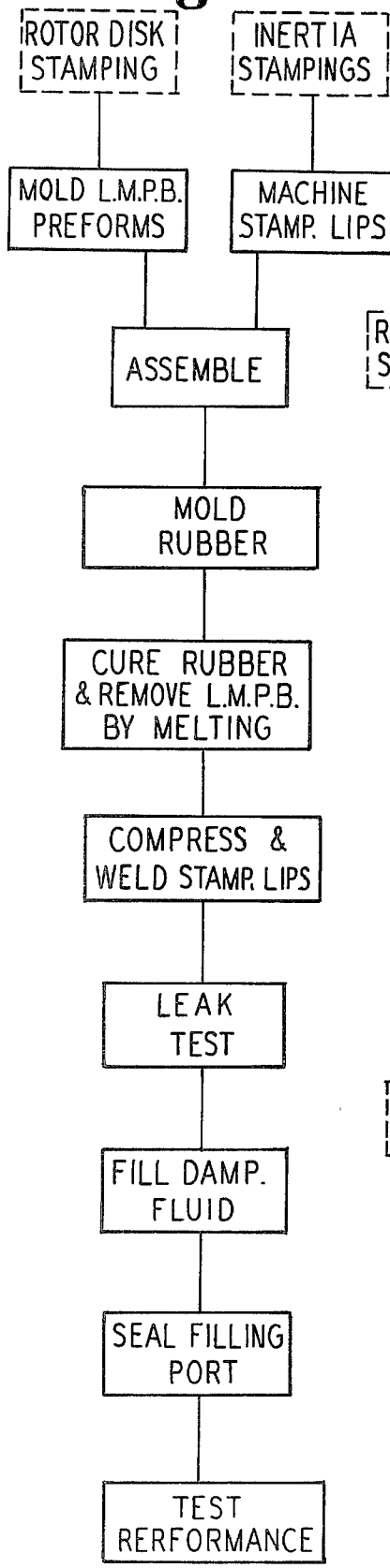
FIG. 9 is a flow diagram demonstrating steps in the method of making the damper of FIGS. 1 and 2.

Referring to FIGS. 1 and 2, a completed tuned rubber/viscous torsional vibration damper 20 embodying the present invention comprises a rotor disk 21, an annular inertia mass 22 carried by the rotor disk 21, combination connecting, spacer, tuning and sealing elastic rubber ring means 23 and viscous damping medium 24 substantially filling a working chamber 25 defined within the inertia mass 22 in cooperation with the rotor disc 21.

In a preferred construction, the rotor disk 21 comprises a circular metal, such as steel, member comprising a circular stamping of the desired diameter adapted to be made with simple metal stamping dies. At its center, the disc 21 has an opening 27 through which a terminal portion of a crankshaft 28 is received and about which opening a hub portion 29 of the disc is attachable to a radial attachment flange 30 on the shaft 28, the hub 29 being provided with an annular series of bolt holes 31 for this purpose. Connected to the hub portion 29 by an offsetting bend 32 is an annular flat body portion 33 of substantial radial extent which projects into the working chamber 25 and has axially oppositely facing working surfaces 34 located in cooperative relation to confronting working surfaces 35 of the inertia mass 22. The working surfaces 34 and 35 are annular, parallel, and spaced apart equivalent to shear films of the viscous damping medium 24.

In a preferred construction, the annular inertia mass 22 comprises a pair of substantially identical concentric, complementary inertia members 37 which are formed as heavy gauge sheet metal stampings. For both the rotor disk 21 and the inertia plate members 37 hot rolled low carbon steel of 0.220 to 0.234 inch (5.588 mm to 5.944 mm) is satisfactory for dampers on the order of 12.31 inch (312.64 mm) outside diameter. Each of the stamped inertia mass parts or plates 37 has at its outer diameter an axially extending spacer flange 38 which in the completed assembly, abuts edge-to-edge the corresponding flange of the companion inertia plate 37. Although any preferred means for securing the plates 37 together may be employed, in a preferred structure, an annular weld 39 in a welding recess 40 across the joint between the flanges 38 not only serves to secure the plates 37 permanently together, but also provides a thorough seal against leakage through the joint from the working chamber 25. The joined flanges 38 are sized to maintain a proper spacing between the working surfaces 35 which are provided on annular radially outer portions 41 of the inertia plates 37. Along their radially inner ends, the inertia plate portions 41 are joined by respective juncture bends 42 to radially inner portions 43 which are spaced axially outwardly relative to the rotor disc body portion 33 to provide respective grooves 44 for accommodating the rubber ring means 23 comprising respective rubber rings 45 of as nearly as practicable equal dimensions and vulcanize bonded to respectively the disk body portion 33 and the axial wall surfaces defining the grooves 44. Depending upon the specific use requirements for the damper 20, various elastic materials, preferably synthetic and all generically referred to herein as "rubber" may be selected from ethylene acrylic, vinyl acetate ethylene, ethylene propylene, epichlorohydrin, chlorosulfonated polyethylene, fluorocarbon, and the like. Any selected material must be capable of being molded, vulcanized and cured and vulcanize bonded to the associated part in situ. In an about 12 inch diameter damper as described, the rubber rings 45 may be about 1⅛ inch (28.575 mm) in their radial dimension beteween their inner and outer diameters and about ⅜ inch (9.5 mm) in thickness, i.e., axial dimension.

Not only to facilitate molding, but also to improve retention of the rings 45, the rings are connected by means of integral circumferentially spaced connecting lugs 47 extending through apertures 48 in the disk body portion 33. In a damper of the dimensions indicated and wherein the dimension between the radially inner and radially outer diameters of the inertia mass 22 are about 2 7/16 inch (62 mm), the apertures 48 may be twenty-four in number, equally spaced, and about 0.250 inch (6.350 mm) in diameter. Desirably also, at their axially outer sides the elastic rings 45 are keyed by means of integral lugs 49 filling socket apertures 50 extending through wall surface areas defining the elastic ring grooves of the plate portions 43. Desirably, there are twenty-four of the holes 50 in each circumferential series, equally spaced and of about 0.250 inch (6.350 mm) diameter. In respect to the holes 50, they are desirably formed with frustoconical tapered enlargements 51 extending from about the center of the thickness of the associated plate 43 in each instance to the inner face of the plate, and narrower generally frustoconical enlargements 52 at the outer ends of the holes 50. This construction not only facilitates molding, but also improves the vulcanize bonding of the lugs 49 to the surfaces defining the holes 50.

Desirably, a rubber skin 53 integral with the radially inner diameters of the rubber rings 45 and integral with the lugs 49 covers the inner edges and the outer surfaces of the plate portions 43 and extends onto the offsetting juncture bends 42. For stability of bond under working stresses in the operation of the damper, fillets 54 are provided at the juncture of the inner diameters of the rubber rings 45 with the inertia disk 21. At the radially outer diameters of the rubber rings 45, fillets 55 connect the junctures of the rings with the disk 21, and fillets 57 connect the outer diameters of the rings at juncture with the plates 37.

At their radially outer edges, the elastic rings 45 are spaced radially inwardly relative to the offsetting bends 42, not only to avoid stressing engagement between the inner surfaces of the bends 42 and the outer edges of the rings, but also to provide substantial reservoir volume for the damping fluid 24 at the radially inner side of the working chamber 25. Connecting the reservoir volumes at each side of the disk portion 33 are holes 58 desirably located adjacent to the fillets 55 and provided in a spaced annular series of twenty-four holes of about 0.187 inch (4.750 mm) diameter. For filling the damper 20 with the damping medium fluid 24, such as a suitable viscosity silicone, each of the inertia plates 37 is provided with a filler hole 59 of suitable diameter such as 0.248-0.255 inch (6.229-6.477 mm). In the assembly, the respective holes 59 are preferably located at diametrically opposite sides of the damper to facilitate filling, utilizing one of the holes as the filler hole and the other of the holes as an air escape hole. After the damper has been filled, the holes 59 are respectively closed by means of plugs 60 which are desirably welded in permanently sealed relation to the associated plate.

In the modified damper 20' of FIGS. 3 and 4, the structural parts and relationships are substantially the same as in the form of FIGS. 1 and 2, and same reference characters identify the same parts, and for most of the identified parts, the description will not be repeated, for sake of brevity. In the damper 20', the elastic tuning spring, spacing and sealing rubber ring means 23' comprising the rings 45' is modified to the extent that integral thin flat rubber fingers 61 extend radially from the rings 45' at circumferentially spaced plurality of locations and are secured fixedly as by vulcanize bonding to certain of the working surfaces in the working chamber 25, in the illustrated instance to the working surfaces 34 of the rotor disk portion 33. The fingers 61 extend throughout the major extent of the working surfaces 34 and are of a width to extend in non-blocking relation to adjacent ones of the apertures 58. In a desirable arrangement, six of the fingers 61 may be provided located at about 60° circumferentially spaced intervals, that is, one of the fingers 61 between each four of the twenty-four apertures 58. The thickness of each of the fingers 61 is desirably only about half of the shear film spacing between the surfaces 34 and 35. Thereby, the fingers 61, since they are of a thickness less than the shear film space between the working surfaces in each side of the working chamber 25, avoid any interference with free relative torsional movement of the rotor disk 21 and the inertia mass 22 in operation of the damper, but the fingers 21 function as spacers or bumpers to prevent direct contact between the working surfaces 34 and 35 in the event of axial load or displacement forces tending to move the rotor disc 21 and the inertia mass axially relative to one another. This effectively avoids metal-to-metal contact of the rotor disk and the inertia mass. In this instance, the vulcanize bonded rings 45' may be provided at their radially inner edges with extensions 62 which lap and are bonded to the inner edges of the inertia plate portions 43. Each of the rings 45' also has lugs 49' extending through and bonded in apertures 50 in the plate portions 43, as well as lugs 47' bonded in apertures 48 in the disk 21. For stress relief and improved bonding, the inside corners of the inner edges of the inertia plate portions 43 may be provided with respective chamfers 63.

To solve the problem of in situ molding of the elastic ring means to both the rotor disk and the inertia mass simultaneously while nevertheless maintaining the working chamber and reservoir area open, the present invention provides a novel method of providing low melting point metal barrier means between the working chamber and the grooves in which the rubber rings are eventually molded and vulcanize bonded, and after the ring means have been cured, melting and removing the barrier means and thereby freeing the volume within the inertia mass occupied by the barrier means for receiving a fill of the viscous damping medium. This can be accomplished in various ways with the same end result. For example, referring to FIG. 5, a low melting point barrier means 64 comprises a ring pre-molded onto the portion 33 of the rotor disk 21, or pre-molded to the disk portion 33 and the plates 43 in the area to be occupied by the working chamber and reservoir volumes in the finished damper, the barrier ring 64 being locked in place by means of integral connecting lugs 65 extending through the apertures 58 in the disk portion 33. Where the barrier ring is pre-molded to the disk portion 33, the mold must have the same surface contours as the working surfaces 35 of the inertia plate portions 41, as well as the inside surfaces defining the flanges 38 and the offsetting bends 42 so that when the plates 37 are assembled, the barrier ring 64 will have a shape closely matching the shape of the engaged surfaces of the plates 37 so as to provide a thorough barrier against escape of fluid rubber material when the rubber ring means 23 is injected to be molded in situ as represented in FIG. 6 (the mold not being shown). To permit eventual melting and draining out of the material of the barrier 64, and coincidentally to permit the rubber ring means to be placed under compression loading, the barrier ring 64 is fashioned to maintain the inertia mass rings 43 spaced apart to the desired extent as for example, in a damper of the size described wherein a gap 66 is maintained between the confronting edges of the spacer flanges 38. In a damper of the size described, a gap of about 0.036 inch (0.914 mm) may suffice.

After the rotor disk 21, the inertia plates 37 and the barrier 64 have been assembled, the assembly is placed in a suitable mold for molding and vulcanizing the elastomer of the rubber ring means 23, such molding being represented by FIG. 6 which shows the assembly after the rubber molding and vulcanizing has been completed. It may be noted that in order to attain the fillets 55 and 57, the low melting point barrier ring 64 is provided with complementary molding surfaces.

After the rubber molding and vulcanizing and curing, the low melting point alloy barrier 64 is melted and drained out through the gap 66. This leaves the area for the working chamber 25 and the radially inner reservoir space at the radially outer sides of the ring accommodating grooves 44 free and clear, as shown in FIG. 9. Then the inertia mass plates 37 are pressed toward one another to bring the edges of the flanges 38 together and the securing, sealing weld 39 is applied. When the damper assembly is completed to this point, the unit may be placed under air test to determine that all joints involving the working chamber 25 are tight. Then the damper shown in FIG. 8 is adapted to be filled in the usual manner with the viscous damping fluid 24 and the filler holes 59 plugged. As shown on comparison of FIGS. 7 and 8, in the final assembly, after the inertia plates 37 have been welded together, the rubber ring means 23 is placed under compression which improves the tuning characteristics of the rubber ring means.

A step-by-step flow diagram involving the method steps of FIGS. 5-8 and resulting in the damper of FIG. 2 is presented in FIG. 9. As will be noted, the low melting point barrier (L.M.P.B.) preform is molded onto the rotor stamping. The inertia stampings have the lips (or terminal spacer flanges 38) machined. Then the rotor stamping carrying the low melting point barrier preform and the inertia stampings are assembled and the rubber ring means molded. The rubber is cured and the low melting poing barrier is then melted and removed. After removal of the barrier means, the assembly is axially compressed and the stamping lips are welded together. The thus-completed assembly is leak-tested and having passed that, is filled with damping fluid and the filling ports sealed. The completed damper may then be tested for performance before shipment to the customer.

A low melting point fusible alloy made of about 6.19% Pb, 38.1% Sn which melts at about 362° F., or a solder made of 70% Sn, 30% Pb and having a solidus temperature of 361° F. and a liquidus temperature of 378° F. are suitable for the purpose. The elastomer for the rubber ring means may have a molding temperature of 325° to 330° F. so that the barrier member will remain solid throughout the rubber molding cycle. After molding of the rubber has been completed, the assembly may be placed in an air circulating oven of over 350° F. in which curing of the rubber ring means is completed and the barrier means melted and removed. The molten barrier means can be reused through another cycle. In the final compressed state, the rubber ring means may be compressed in the range of 1% to 6%, depending on the desired tuning results. In compression, since the rubber is vulcanize bonded to the damper members, the amount of compression is relatively limited to the bulging in the end areas of the rubber rings. If necessary, the damper assembly may be subjected to a spinning action when the barrier material is being melted out.

On reference to FIG. 13, there is depicted the manner in which the barrier ring 64 is preform mounted on the portion 33 of the rotor disk 21 whereafter the inertia ring plates 37 are assembled with the rotor disk and held concentric therewith by the barrier ring 64.

Figure 10:
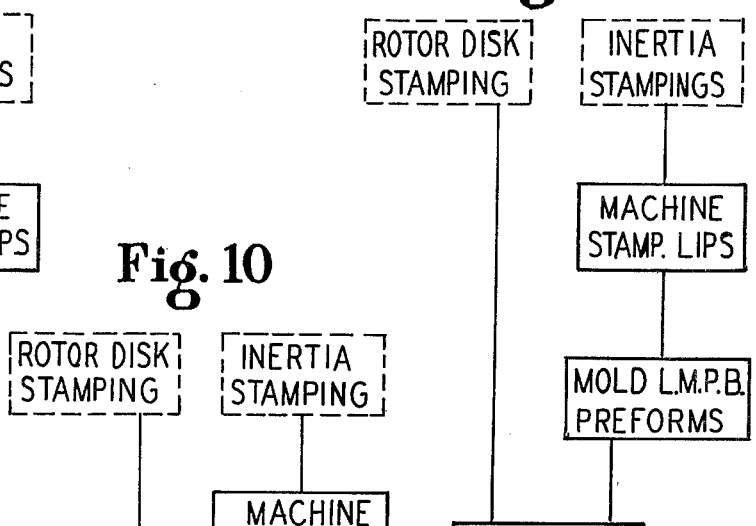
FIGS. 10, 11 and 12 are partial flow diagrams demonstrating modifications in the method of making the damper.
Figure 11:
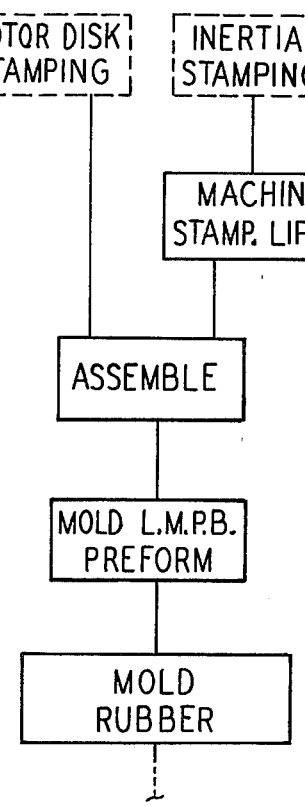

If it is desired to mold the barrier ring 64 in place by utilizing the inertia plates 37 as a mold, the whole assembly may be placed in a fixture wherein the plates 37 are maintained in proper concentric relation to one another and to the rotor disk 21 and properly spaced, a suitable retainer placed about the outer perimeter of the assembly and in closing relation to the filler openings in the plates 37, and the barrier ring 64 produced by spinning the assembly while the proper volume of molten barrier material is introduced into the molding cavity provided by the assembled damper members, and the barrier ring then hardened in place. Thereafter, the several steps involving molding of the rubber ring means, removal of the barrier and completion of the damper may proceed as already described. It will be appreciated that were the barrier 64 is molded in place in the rotor disk and inertia plate assembly, the assembly ready for rubber molding will be as depicted in FIG. 5. A flow diagram involving this modification in the method of making the damper is presented in FIG. 10 to the point of molding the rubber, and from that point on the method may comprise the steps further depicted in FIG. 9.

In making the damper according to the embodiment of FIGS. 3 and 4, FIGS. 11 and 14 may be referred to wherein the low melting point barrier may be molded into two halves or sections 64' in place on the inertia mass plates 37. For this purpose, each of the barrier sections 64' is desirably dimensioned to occupy not only the eventual working chamber for the damper, but also the reservoir space between the working chamber and the rubber ring means as well as the space between the outer diameter of the rotor disk 21 and the outer diameter of the working chamber defined by the inner surfaces of the lip flanges 38. In addition, the inner faces of the barrier sections 64' are provided with respective finger molding recesses 67 which open radially inwardly so that when the rubber ring means are molded, the rubber material in the fused state will fill the finger cavities or recesses 67 and become vulcanize bonded to the rotor disk in the vulcanization of the rubber ring means. Molding of the barrier sections 64' to the inertia stampings or plates is reflected in FIG. 11 in the step "mold L.M.P.B. preforms." It will be appreciated that in the assembled relationship of the rotor disk 21 and the inertia plates 37 carrying the barrier sections 64', the barrier sections 64' will maintain all of the parts in properly concentric spaced relation. From the molding step on, the method may proceed as described in connection with FIG. 9.

Instead of molding the barrier means directly onto the rotor disk 21 as in FIG. 13, or onto the inertia plates 37 as in FIG. 14, the barrier means may be provided as separately formed premolds and assembled with the other members of the damper assembly. For example, in FIG. 15, two separately premolded substantially identical, complementary ring-shaped barrier sections 68 formed from low melting point alloy are assembled first with the rotor disk 21, one at each side of the outer rotor disk portion 33, and then the inertia plate sections or members 37 are assembled with the rotor disk barrier assembly. For this purpose, each of the barrier sections 60 may, as shown, be shaped to fit in what ultimately will be the reservoir space at the inner side of the working chamber 25, the barrier sections 68 fitting against the respective offsetting bends 42 and being connected together and to the rotor disk 21 by means of one or more connecting pins 69 extending through respective ones of the holes 58 and snugly engaged in respective aligned sockets 70 provided for this purpose in the preformed barrier sections 68. The pins 69 may be formed from the same low melting point material as the barrier sections 68, so that when the barrier is subsequently melted out of the damper assembly, the pins will also be melted out.

Where it is desired to provide the damper with spacer fingers 61 as in the embodiment of FIG. 3, preforms 68' as depicted in FIG. 16 may be provided which are substantially the same as the preformed barriers 68 in FIG. 15, but are provided with extension 71 to fill the working chamber space and also provide rubber finger forming recesses or cavities 72 which open through the inner sides of the barrier sections 68' to receive rubber in molten state injected into the damper assembly during the rubber ring molding step, similarly as described in connection with FIG. 14. In the assembly, the barrier sections 68' will be secured concentrically to the rotor disk 21 by pin means 69 similarly as the sections 68 in FIG. 15.

Figure 12:
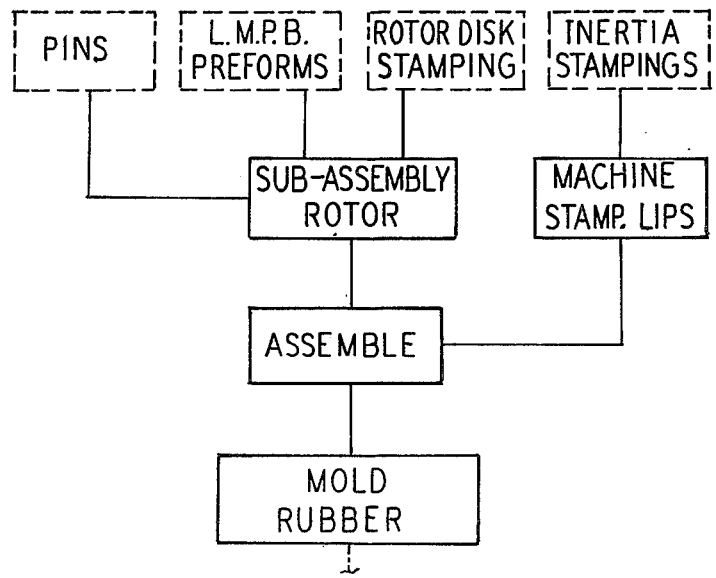

A flow diagram in respect to the method of making the damper involving the embodiments of FIGS. 15 and 16, is depicted in FIG. 12. According to this method, the rotor disk stamping, the inertia mass stampings, the low melting point barrier preforms and the connecting pins are all separately formed and the barrier preforms are pinned to the rotor disk stamping as a sub-assembly. The inertia mass stampings have the outer peripheral lip flanges machined and the inertia stampings are assembled with the rotor disk-low melting point preform sub-assembly. Then the rubber is molded in the assembly. Subsequent steps in the method may follow those described in FIG. 9 after molding of the rubber.

As will be apparent, regardless of which form of the low melting point metal barrier is employed, injection loading and molding, vulcanization and curing of the rubber ring means will result in both of the rubber rings being of substantially the same density or durometer as well as other characteristics. Dimensionally the rubber rings will be substantially identical. Therefore, under compression in the finished damper, not only will the rings maintain the metal damper parts properly spaced, particularly in respect to the working chamber where best results are attained when the shear film spacing is as nearly as practicable equal in each axial side of the working chamber. Also since the rings are substantially identical in size and other characteristics, tuning efficiency is assured. By virtue of the vulcanize bonding of the rings to all of the metal parts, assurance against bond separation is maintained. Keying of the rubber rings to one another and to the metal parts additionally improves assurance against separation between the metal parts and the rubber rings. Because of simplification and improvements in assured precision in the method of making the dampers and reduction in rejection rate, significant cost savings are effected, while at the same time attaining consistent damping performance.

It will be understood that variations and modifications may be effected without departing from the spirit and scope of the novel concepts of this invention.

We claim as our invention:

1. A method of making a rubber/viscous torsional vibration damper assembly of the type having supporting rotor disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides of and facing axially toward said body radially inwardly adjacent to the opening from said chamber, with elastic tuning spring, spacing and sealing rubber rings coupling surface areas on said inertia mass in said grooves with opposing surface areas on said body, comprising:
   providing low melting point metal barrier means between said working chamber and said grooves;
   molding and vulcanizing said rubber rings in said grooves and bonding them to said surface areas, while relying on said barrier means against any detrimental intrusion of the material of said rings into said working chamber;
   curing said rings;
   and melting and removing said barrier means and thereby freeing the volume within said inertia mass occupied by said barrier means then providing a fill of said viscous damping medium.

2. A method according to claim 1, wherein said inertia mass comprises separate complementary plate members, and utilizing said barrier means to maintain said plate members spaced apart from one another and from said rotor disk means until said rubber rings have been vulcanized.

3. A method according to claim 1, wherein said inertia mass comprises separate plates, and maintaining a gap at the outer diameters of said plates until said rubber rings have been vulcanized, and removing the melted barrier means through said gap.

4. A method according to claim 1, comprising forming interlocking lugs integral with said rubber rings in sockets in said inertia mass.

5. A method according to claim 4, comprising interconnecting said rubber rings by integrally vulcanizing connecting lugs through apertures in said rotary disk means body.

6. A method according to claim 1, comprising vulcanizing bonding spacer finger extensions from said rubber rings onto selected ones of said working surfaces.

7. A method according to claim 1, comprising forming a rubber skin coating on outside areas of said inertia mass and connecting the skin to exposed areas of said rings.

8. A method according to claim 1, including forming a plurality of circumferentially spaced rubber fingers to extend radially from said rings and securing said fingers fixedly to certain of said working surfaces in said working chamber, and maintaining the thickness of said fingers less than the shear film space between said working surfaces so that the fingers will function as spacers or bumpers to prevent direct contact between the working surfaces in the event of axial load or displacement forces tending to move said rotor disk and said inertia mass axially relative to one another, providing an annular series of spaced apertures through said surface areas of said inertia mass and forming integral lugs on said rings and filling said apertures with said lugs, and forming a rubber skin coating on outside areas of said inertia mass and connecting said coating to exposed areas of said rings.

9. A method according to claim 1, which comprises molding said low melting point metal barrier means directly onto said rotor disk means body portion.

10. A method according to claim 1, comprising molding said barrier means directly onto both said rotor disk means body portion and said inertia mass.

11. A method according to claim 1, wherein said inertia mass comprises a pair of inertia mass plates, molding said barrier means in part on one of said plates, and in part on the other of said plates, and assembling said plates with said rotor disk means with said barrier means parts engaging said rotor disk means body portion.

12. A method according to claim 1, comprising molding said barrier means in preform molded parts, and assembling said preform molded parts with said rotor disk means body portion.

13. A method according to claim 12, which comprises pinning said preform barrier parts to said body portion.

14. A method according to claim 1, comprising forming said barrier means with finger molding cavities, and locating said cavities in facing relation to selected working surfaces in said working chamber, and in the molding and vulcanizing of said rubber rings, molding rubber fingers in said cavities and vulcanizing the fingers to said selected surfaces.

15. A method of making a rubber/viscous torsional vibration damper assembly of the type having supporting rotor disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides of and facing axially toward said body radially inwardly adjacent to the opening from said chamber, with elastic tuning spring, spacing and sealing rubber rings coupling surface areas on said inertia mass in said grooves with opposing surface areas on said body, comprising:
    forming a circumferentially spaced plurality of rubber fingers extending radially from said rubber rings;
    securing said fingers fixedly to certain of said working surfaces at each axial side of said working chamber;
    and sizing said fingers to be of a thickness less than the shear film space between said working surfaces in each side of said working chamber whereby to function as spacers or bumpers to prevent direct contact between said working surfaces in the event of axial load or displacement forces tending to move said rotor disk and said inertia mass axially relative to one another.

16. A method of making a rubber/viscous torsional vibration damper assembly of the type having supporting rotor disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides of and facing axially toward said body radially inwardly adjacent to the opening from said chamber, with elastic tuning spring, spacing and sealing rubber rings coupling surface areas on said inertia mass in said grooves with opposing surface areas on said body and exposed at their radially inner sides at said opening, comprising:
    providing an annular series of spaced apertures through said surface areas of said inertia mass;
    forming integral lugs on said rubber rings and filling said apertures with said lugs;
    forming a rubber skin coating on outside areas of said inertia mass;
    and connecting said coating to exposed areas of said rings including said radially inner sides and said lugs.

17. A method of making a rubber/viscous torsional vibration damper assembly of the type having supporting rotor disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides of and facing axially toward said body radially inwardly adjacent to the opening from said chamber, with elastic tuning spring, spacing and sealing rubber rings coupling surface areas on said inertia mass in said grooves with opposing surface areas on said body, comprising:
    forming a rubber skin coating on outside areas of said inertia mass;
    and connecting said coating to exposed radially inner areas of said rings.

* * * * *